United States Patent
Chuang et al.

(10) Patent No.: US 11,774,065 B2
(45) Date of Patent: Oct. 3, 2023

(54) QUANTUM DOT COMPOSITION, COLOR CONVERSION FILM AND BACKLIGHT MODULE

(71) Applicant: Nano Precision Taiwan Limited, Hsinchu County (TW)

(72) Inventors: Ching-Nan Chuang, Hsinchu County (TW); Yen-Ni Lin, Hsinchu County (TW); Shih-Yuan Liu, Hsinchu County (TW)

(73) Assignee: Nano Precision Taiwan Limited, Hsinchu County (TW)

( * ) Notice: Subject to any disclaimer, the term of this patent is extended or adjusted under 35 U.S.C. 154(b) by 316 days.

(21) Appl. No.: 17/380,018

(22) Filed: Jul. 20, 2021

(65) Prior Publication Data
US 2022/0033707 A1     Feb. 3, 2022

(30) Foreign Application Priority Data

Jul. 28, 2020    (CN) .......................... 202010735681.1

(51) Int. Cl.
| | |
|---|---|
| *F21V 9/30* | (2018.01) |
| *G02F 1/13357* | (2006.01) |
| *G02B 5/22* | (2006.01) |
| *C09K 11/02* | (2006.01) |
| *G02F 1/1335* | (2006.01) |
| *B82Y 20/00* | (2011.01) |

(52) U.S. Cl.
CPC .............. *F21V 9/30* (2018.02); *C09K 11/025* (2013.01); *G02B 5/22* (2013.01); *G02F 1/133603* (2013.01); *G02F 1/133614* (2021.01); *B82Y 20/00* (2013.01)

(58) Field of Classification Search
CPC ... C09K 11/025; G02B 5/22; G02F 1/133603; G02F 1/133614; F21V 9/30
See application file for complete search history.

(56) References Cited

U.S. PATENT DOCUMENTS

| | | | |
|---|---|---|---|
| 9,199,842 B2 | 12/2015 | Dubrow et al. | |
| 9,804,319 B2 | 10/2017 | Dubrow et al. | |
| 2016/0161066 A1* | 6/2016 | Sung .................... | C09K 11/703 252/301.36 |

FOREIGN PATENT DOCUMENTS

| | | | |
|---|---|---|---|
| CN | 104932051 | | 9/2015 |
| CN | 106810645 | * | 6/2017 |
| CN | 108250754 | | 7/2018 |
| CN | 106188398 | | 4/2019 |
| CN | 109749733 | | 5/2019 |
| CN | 111123648 | | 5/2020 |
| TW | 201412937 | | 4/2014 |

OTHER PUBLICATIONS

Translation for CN 106810645, Jun. 9, 2017.*
"Office Action of Taiwan Counterpart Application", dated Oct. 7, 2021, p. 1-p. 4.

* cited by examiner

*Primary Examiner* — C Melissa Koslow
(74) *Attorney, Agent, or Firm* — JCIPRNET

(57) ABSTRACT

A quantum dot composition includes a matrix resin, a quantum dot phosphor, and a polysilane polymer. The matrix resin includes epoxy-fluorene copolymer acrylic resin represented by Formula 1:

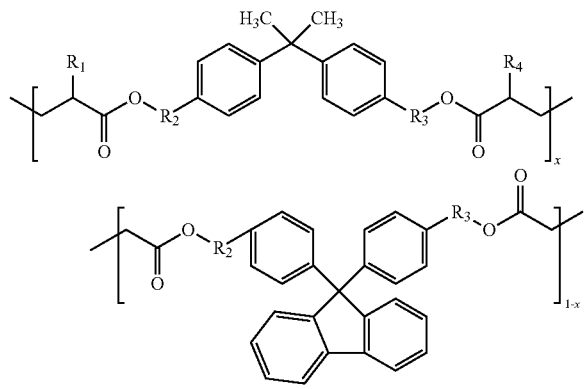

Formula 1. In Formula 1, $R_1$ and $R_4$ each is independently hydrogen or a C1-C12 long alkyl carbon chain. $R_2$ and $R_3$ each is independently

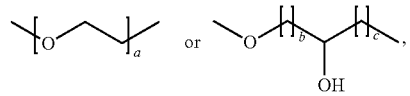

a is an integer from 1 to 10, and b and c each is independently an integer from 0 to 10. X is 0.1 to 0.9. A color conversion film including the quantum dot composition and a backlight module using the color conversion film are also provided.

10 Claims, 3 Drawing Sheets

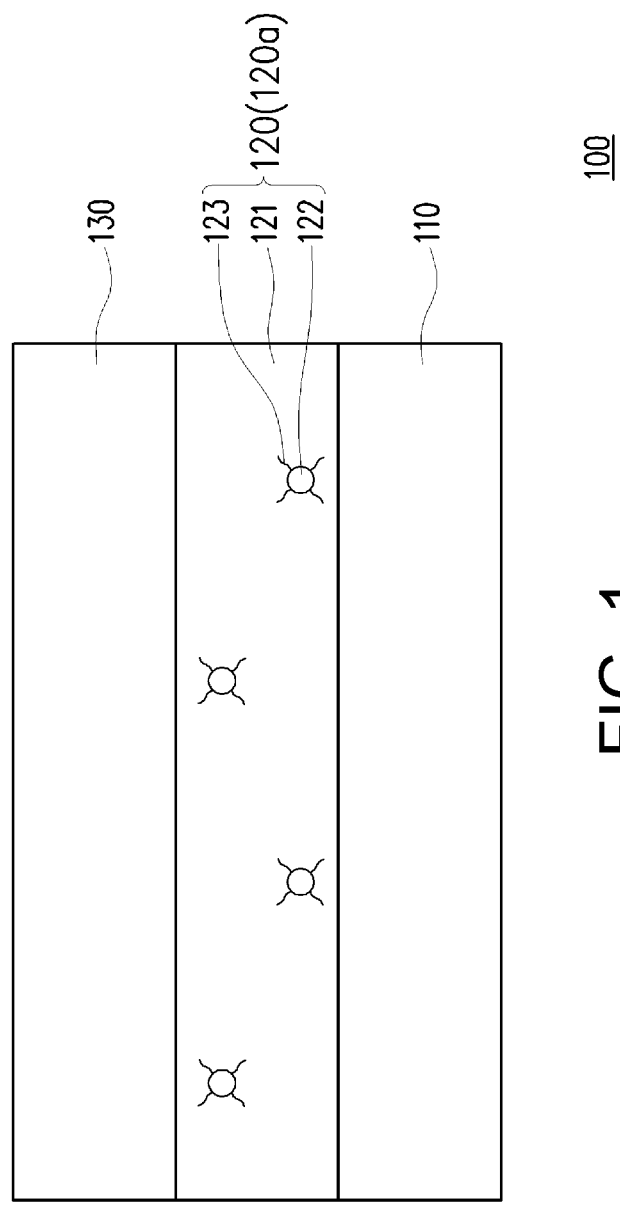

QUANTUM DOT COMPOSITION, COLOR CONVERSION FILM AND BACKLIGHT MODULE

CROSS-REFERENCE TO RELATED APPLICATION

This application claims the priority benefit of China application serial no. 202010735681.1, filed on Jul. 28, 2020. The entirety of the above-mentioned patent application is hereby incorporated by reference herein and made a part of this specification.

BACKGROUND

Technical Field

The disclosure relates to a quantum dot composition, a color conversion film, and a backlight module, and in particular, to a quantum dot composition, a color conversion film, and a backlight module with a favorable water vapor and oxygen barrier property.

Description of Related Art

In existing liquid crystal displays, generally, blue light emitting diodes serve as backlight sources and work together with wide color gamut color conversion films to achieve the white light technology. However, quantum dot layers in the color conversion films have a limited capability of resisting external water vapor and oxygen. Thus, when water vapor and oxygen continuously enter the quantum dot layers, quantum dot phosphors in the quantum dot layers are prone to oxidization and failure.

At present, although a barrier film with a water vapor and oxygen barrier property is disposed on the upper side and the lower side of a quantum dot layer to protect the quantum dot layer, water vapor and oxygen may still enter the quantum dot layer from the left side and the right side, so that the quantum dot phosphor may still fail, leading to generation of a failure area.

The information disclosed in this BACKGROUND section is only for enhancement of understanding of the background of the described technology and therefore it may contain information that does not form the prior art that is already known to a person of ordinary skill in the art. Further, the information disclosed in the BACKGROUND section does not mean that one or more problems to be resolved by one or more embodiments of the invention was acknowledged by a person of ordinary skill in the art.

SUMMARY

The disclosure provides a quantum dot composition with a favorable water vapor and oxygen barrier property.

The disclosure further provides a color conversion film and a backlight module including the quantum dot composition.

The quantum dot composition of the disclosure includes a matrix resin, a quantum dot phosphor, and a polysilane polymer. The matrix resin includes epoxy-fluorene copolymer acrylic resin represented by Formula 1:

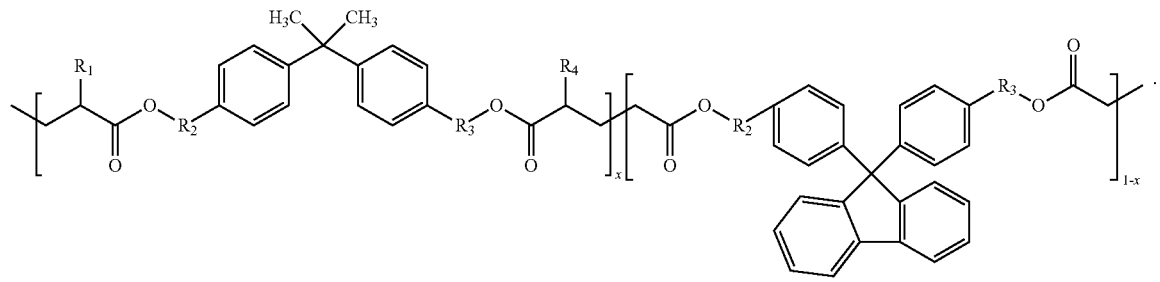

Formula 1

In Formula 1, $R_1$ and $R_4$ each is independently hydrogen or a C1-C12 long alkyl carbon chain. $R_2$ and $R_3$ each is independently

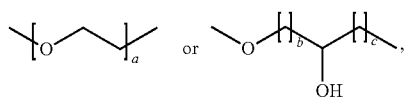

a is an integer from 1 to 10, and b and c each is independently an integer from 0 to 10. X is 0.1 to 0.9.

The color conversion film of the disclosure includes a first substrate layer, a quantum dot layer and a second substrate layer. The quantum dot layer is disposed on the first substrate layer, and the quantum dot layer includes the above quantum dot composition. The second substrate layer is disposed on the quantum dot layer.

The backlight module of the disclosure includes a light source and the above color conversion film. The color conversion film is disposed on a light emitting path of the light source.

Based on the above, in the quantum dot composition of the embodiments of the disclosure, since the quantum dot composition includes the epoxy-fluorene copolymer acrylic resin represented by Formula 1 and the polysilane polymer, the quantum dot composition has a favorable water vapor and oxygen barrier property. In addition, compared with a conventional color conversion film and a backlight module, the color conversion film and the backlight module of the embodiment include the quantum dot composition and thus are capable of providing a favorable water vapor and oxygen barrier property as well.

To make the features and advantages of the disclosure clear and easy to understand, the following gives a detailed description of embodiments with reference to accompanying drawings.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic cross-sectional view illustrating a color conversion film according to an embodiment of the disclosure.

DESCRIPTION OF THE EMBODIMENTS

Figure 2A:
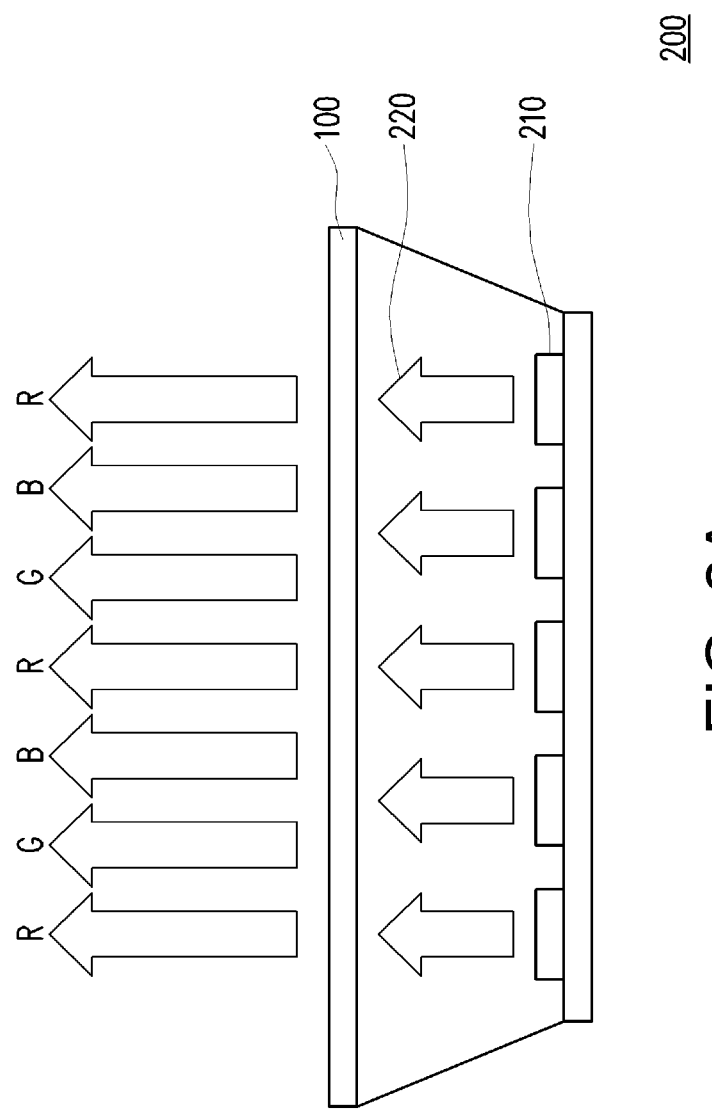
FIG. 2A is a schematic cross-sectional view illustrating a backlight module according to an embodiment of the disclosure.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

In the specification, a range represented by "one value to another value" shows a schematic representation mode to avoid listing out all values one by one in the specification. Thus, recording of a certain specific value range covers any values within the value range and a smaller value range defined by any values within the value range, just like explicit writing out of any values and a smaller value range in the specification.

In the specification, sometimes, a skeleton formula represents a structure of a polymer or a group. By means of such a representation method, carbon atoms, hydrogen atoms and hydrocarbon bonds may be omitted. Certainly, figures are considered as criteria when there are atoms or atomic groups definitely drawn out in a structural formula.

An embodiment of the disclosure provides a quantum dot composition with a favorable water vapor and oxygen barrier property and capable of being used for preparing a color conversion film and a backlight module. The embodiments are described as follows, but the disclosure is not limited thereto.

<Quantum Dot Composition>

The quantum dot composition of the embodiment includes a matrix resin, a quantum dot phosphor, and a polysilane polymer. The above various components are described in detail as follows.

Matrix Resin

In the embodiment, the matrix resin includes epoxy-fluorene copolymer acrylic resin represented by Formula 1:

Formula 1

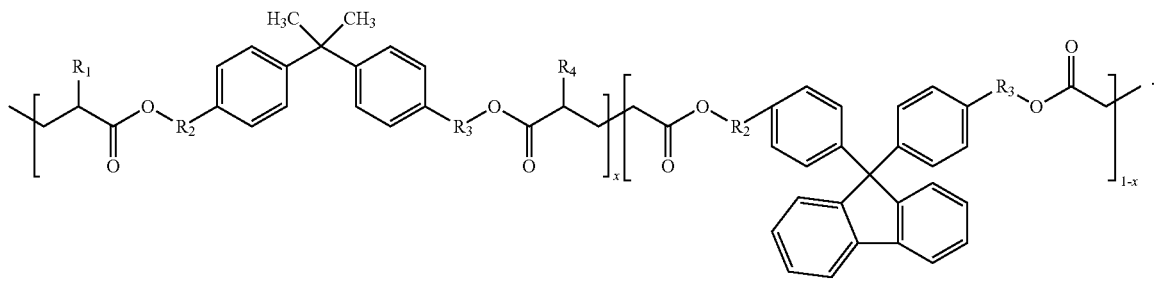

In above Formula 1, $R_1$ and $R_4$ each is independently hydrogen or a C1-C12 long alkyl carbon chain. $R_2$ and $R_3$ each is independently

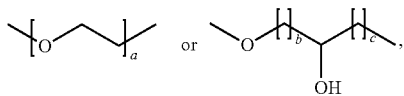

where a is an integer from 1 to 10, and b and c each is independently an integer from 0 to 10. X is, for example, 0.1 to 0.9, preferably 0.4 to 0.8.

In the embodiment, a weight average molecular weight of the epoxy-fluorene copolymer acrylic resin represented by Formula 1 may be, for example, equal to or less than 50,000 g/mol. In addition, the above epoxy-fluorene copolymer acrylic resin has a high index of refraction (for example, equal to or greater than 1.5) and may be used for evenly dispersing the quantum dot phosphor. In addition, when the above epoxy-fluorene copolymer acrylic resin individually serves as the matrix resin, based on a total weight of the quantum dot composition, a content of the epoxy-fluorene copolymer acrylic resin is, for example, 50 wt % to 90 wt %, preferably 60 wt % to 80 wt %.

Cross-Linking Agent

In some embodiments, the matrix resin may further include a cross-linking agent except for the epoxy-fluorene copolymer acrylic resin, so that a cross-linking density of the matrix resin may be improved, and then the property of the matrix resin of protecting the quantum dot phosphor is improved. The cross-linking agent may be, for example, a trifunctional monomer or a hexafunctional monomer, but the disclosure is not limited thereto.

The trifunctional monomer includes

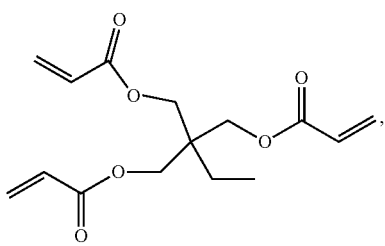

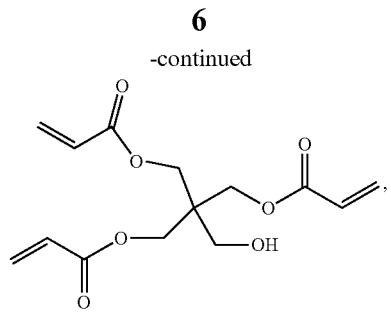

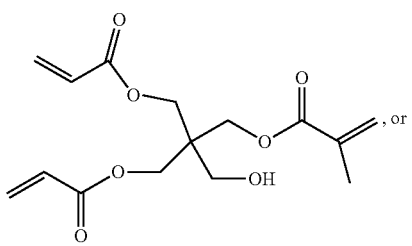

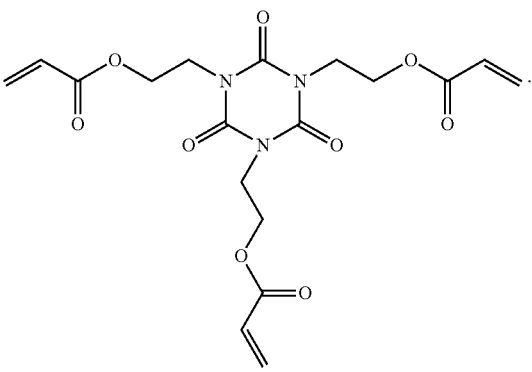

The hexafunctional monomer includes

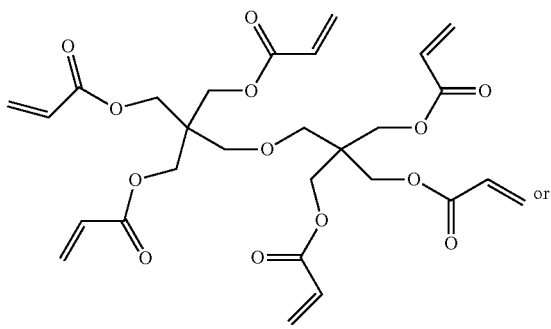

-continued

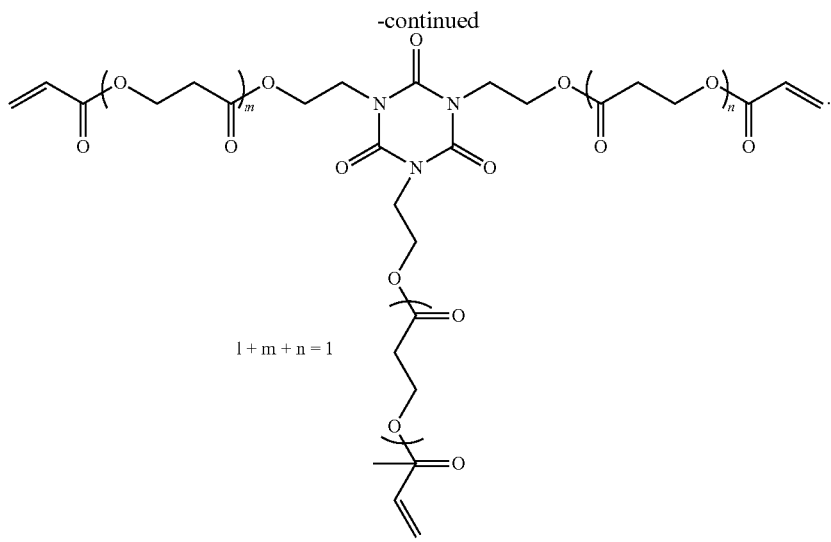

$l + m + n = 1$

In some embodiments, based on the total weight of the quantum dot composition, a content of the trifunctional monomer or the hexafunctional monomer is, for example, 5 wt % to 20 wt %, preferably 8 wt % to 15 wt %.

In some embodiments, when matrix resin includes epoxy-fluorene copolymer acrylic resin and the trifunctional monomer (or the hexafunctional monomer), based on the total weight of the quantum dot composition, a content of the matrix resin is, for example, 45 wt % to 75 wt %, preferably 52 wt % to 75 wt %.

Quantum Dot Phosphor

In the embodiment, the quantum dot phosphor may be, for example, a red light quantum dot and a green light quantum dot, but the disclosure is not limited thereto. The red light quantum dot may emit red light by being illuminated by excitation light and the green light quantum dots may emit green light by being illuminated by excitation light.

In addition, based on the total weight of the quantum dot composition, a content of the quantum dot phosphors is, for example, 0.01 wt % to 10 wt %, preferably 0.1 wt % to 5 wt %, and in other embodiments, preferably 0.5 wt % to 2 wt %.

Polysilane Polymer

In the embodiment, the polysilane polymer may be of a straight chain shape, a branch chain shape or a cyclic shape. The polysilane polymer is represented by Formula 2:

Formula 2

In Formula 2, $R_{a1}$ and $R_{a2}$ each is independently hydrogen, a group-carrying functional group or a silyl group. n is, for example, 10 to 500, preferably 10 to 100.

In the embodiment, the group-carrying functional group may be, for example, a methyl alkyl group, a long-alkyl-chain functional group (C1-C8), a naphthenic functional group or an aromatic ring functional group, preferably a methyl alkyl group or a benzene ring group.

In the embodiment, a weight average molecular weight of the polysilane polymer may be, for example, 300 g/mol to 15,000 g/mol, preferably 700 g/mol to 1,200 g/mol. In addition, based on a total weight of a quantum dot composition, a content of the polysilane polymer is, for example, 1 wt % to 20 wt %, preferably 5 wt % to 10 wt %.

In the embodiment, since surface ligands of the quantum dot phosphors include amino groups or carboxylic acid groups of a plurality of long alkyl carbon chains, hydrophobic functional groups (such as benzene rings or long carbon chains) of the polysilane polymer may be adsorbed to surfaces of the quantum dot phosphors by means of an acting force such as a Van Der Waals force or hydrogen bonds, thereby protecting the quantum dot phosphors against deterioration under a high-temperature and high-humidity environment and a high-temperature environment.

Light-Scattering Particle

In some embodiments, the above quantum dot composition may further include a light-scattering particle, so that excitation light emitted into the color conversion film may be scattered, and a color may be effectively converted.

In some embodiments, the light-scattering particle includes an organic light-scattering particle, an inorganic light-scattering particle, or a combination thereof. The organic light-scattering particle may include a polymer particle containing a poly(methyl methacrylate) (PMMA) polymer, poly(butyl methacrylate) (PBMA), or a combination thereof. The inorganic light-scattering particle may include a particle containing silicon, silicon dioxide, aluminum oxide, titanium dioxide, zirconium dioxide, zinc oxide, or a combination thereof.

In some embodiments, the organic light-scattering particle and the inorganic light-scattering particle may be individually used as a light-scattering particle or may be mixed with each other for use. In addition, based on the total weight of the quantum dot composition, a content of the light-scattering particle is, for example, 5 wt % to 40 wt %, preferably 10 wt % to 30 wt %.

Sensitizer

In some embodiments, the above quantum dot composition may further include a sensitizer, so that a curing integrity (or curing conversion rate) of the whole resin may be improved. When the curing integrity is higher, a water vapor and oxygen barrier degree may be improved.

In some embodiments, the sensitizer includes:

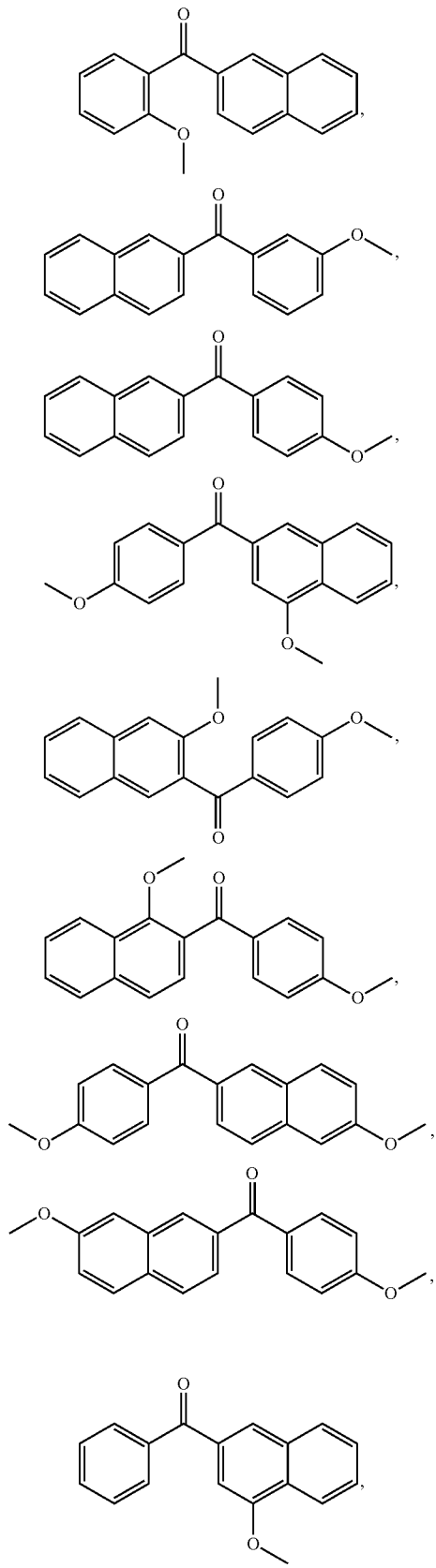

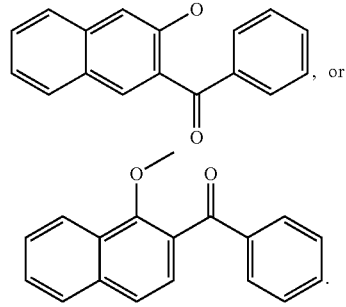

, or

[structure]

.

In some embodiments, based on the total weight of the quantum dot composition, a content of the sensitizer is, for example, 5 wt % to 40 wt %, preferably 10 wt % to 30 wt %.

<Color Conversion Film>

An embodiment of the disclosure provides a color conversion film. FIG. 1 is a schematic cross-sectional view illustrating the color conversion film according to an embodiment of the disclosure. Layers are not drawn according to an actual scale. With reference to FIG. 1, the color conversion film of the embodiment will be described in detail as follows.

As shown in FIG. 1, the color conversion film 100 of the embodiment includes a first substrate layer 110, a quantum dot layer 120 and a second substrate layer 130. The quantum dot layer 120 is disposed on the first substrate layer 110, the second substrate layer 130 is disposed on the quantum dot layer 120, and the quantum dot layer 120 is located between the first substrate layer 110 and the second substrate layer 130.

Specifically, in the embodiment, the quantum dot layer 120 is formed from a quantum dot composition 120a. The quantum dot composition 120a at least includes a matrix resin 121, a quantum dot phosphor 122, and a polysilane polymer 123. In addition, a thickness of the quantum dot layer 120 is, for example, 100 microns, but the disclosure is not limited thereto. A material of the first substrate layer 110 and a material of the second substrate layer 130 are, for example, polyethylene terephthalate (PET), polyethylene naphthalate (PEN), or a bearing material with an anti-scratch property and a light-transmitting property. A thickness of the first substrate layer 110 and a thickness of the second substrate layer 130 are, for example, 100 microns, but the disclosure is not limited thereto.

In the color conversion film 100 of the embodiment, since the quantum dot layer 120 formed from the quantum dot composition 120a has a favorable water vapor and oxygen barrier property, compared with conventional color conversion films, the color conversion film 100 of the embodiment may be free of additional barrier films with a water vapor and oxygen barrier property on an interface of the first substrate layer 110 and the quantum dot layer 120 and an interface of the quantum dot layer 120 and the second substrate layer 130.

<Backlight Module>

Figure 2B:
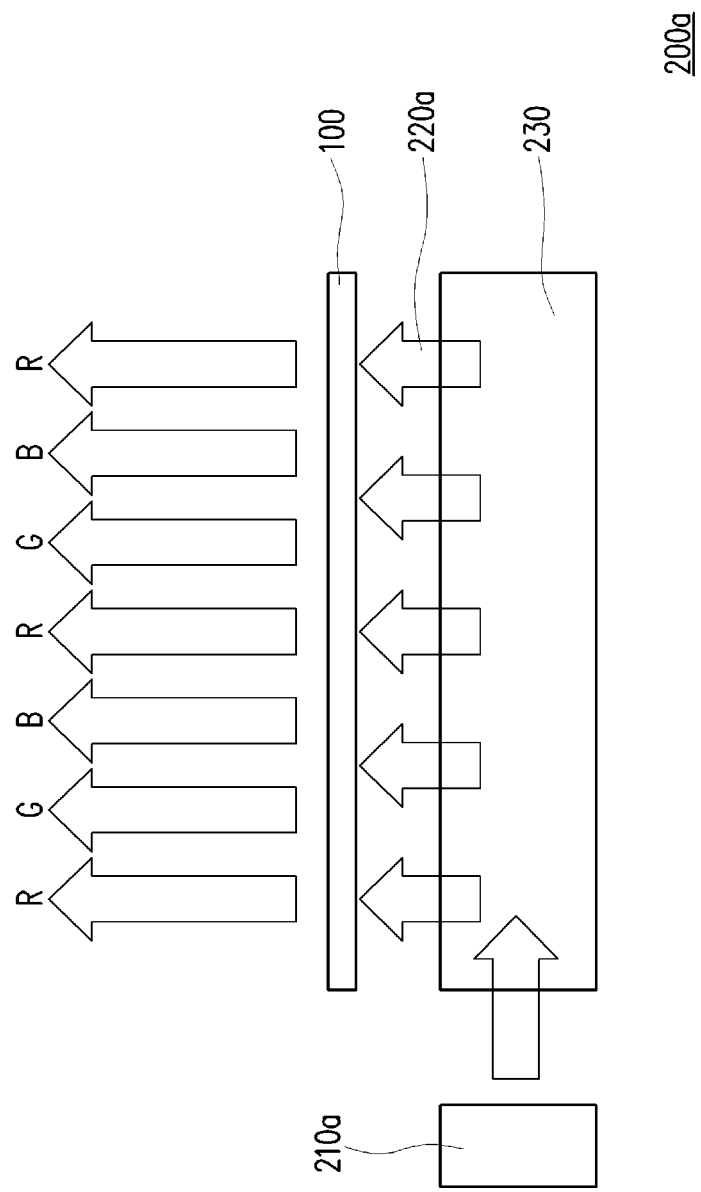
FIG. 2B is a schematic cross-sectional view illustrating a backlight module according to another embodiment of the disclosure.

Another embodiment of the disclosure further provides a backlight module. The backlight module may be, for example, a direct-lit type backlight module or a lateral-incidence type backlight module, but the disclosure is not limited thereto. FIG. 2A is a schematic cross-sectional view illustrating a backlight module according to an embodiment of the disclosure. FIG. 2B is a schematic cross-sectional view illustrating a backlight module according to another embodiment of the disclosure.

With reference to FIG. 2A first, the backlight module 200 of the embodiment at least includes a light source 210 and the above color conversion film 100. The color conversion film 100 is disposed on a light emitting path 220 of the light source 210, and the color conversion film 100 is located over the light source 210 (namely, the light source 210 is located under the color conversion film 100), so that the light emitting path 220 of the light source 210 may directly emit out red light R, green light G and blue light B towards the color conversion film 100. In other words, the backlight module 200 of the embodiment may be considered as a direct-lit type backlight module. An orthographic projection of the color conversion film 100 may overlap with an orthographic projection of the light source 210. In addition, in the embodiment, the light source 210 may be, for example, a blue light emitting diode (LED) or an ultraviolet light emitting diode, but the disclosure is not limited thereto.

Next, with reference to FIG. 2B, a backlight module 200a of the embodiment at least includes a light source 210a and the color conversion film 100. The color conversion film 100 is disposed on a light emitting path 220a of the light source 210a. However, different from the backlight module 200, since the light source 210a of the backlight module 200a of the embodiment is disposed on a lateral side of the color conversion film 100, the light source 210a cannot emit out red light R, green light G or blue light B towards the color conversion film 100 until its light emitting path 220a penetrates through a light guide plate 230. In other words, the backlight module 200a of the embodiment may be considered as a lateral-incidence type backlight module. An orthographic projection of the color conversion film 100 does not overlap with an orthographic projection of the light source 210a. In addition, in the embodiment, the light source 210a may also be, for example, a blue light emitting diode or an ultraviolet light emitting diode, but the disclosure is not limited thereto.

With reference to a couple of experiments as follows, the quantum dot composition and the color conversion film are described more specifically. Though the following experiments are described, applied materials, amounts and ratios thereof, processing details, processing procedures, etc. can be properly modified under the condition of not going beyond the scope of the disclosure. Thus, restrictive interpretation shall not be given to the disclosure according to the following experiments. The embodiments will be listed out as follows to describe the disclosure in detail, but the disclosure is not limited to contents disclosed by these embodiments.

<Preparation of Color Conversion Film>

Example 1

First, 10 wt % of green light quantum dots and 8 wt % of a polysilane polymer are mixed to form a quantum dot dispersion liquid A. (The embodiment lists out a single color, so only one type of dispersion liquid is formed)

Then, the quantum dot dispersion liquid A is added to 70 wt % of matrix resin. The matrix resin includes 65 wt % of epoxy-fluorene copolymer acrylic resin reed by Formula 1 and 10 wt % of a trifunctional monomer (or 5 wt % of a hexafunctional monomer).

After that, 5 wt % of a sensitizer is then added to be evenly mixed to form a resin mixed solution. Then, the resin mixed solution and 20 wt % of the light-scattering particle are mixed to form a quantum dot composition. A particle size of the light-scattering particle is, for example, 1 micron, but the disclosure is not limited thereto.

The quantum dot composition is applied to a PET film and illuminated by UV to be cured to form a quantum dot layer. Then, a PET film is formed on the cured quantum dot layer to prepare the color conversion film of Example 1.

Comparative Example 1

A color conversion film of Comparative Example 1 is prepared through steps the same as steps of Example 1, but it has a difference that a quantum dot composition used in Comparative Example 1 does not include the polysilane polymer.

Comparative Example 2

A color conversion film of Comparative Example 2 is prepared through steps the same as steps of Example 1, but it has a difference that matrix resin used in Comparative Example 2 includes ordinary acrylic resin (such as PMMA acrylic series resin, but the disclosure is not limited thereto), but does not include the epoxy-fluorene copolymer acrylic resin represented by Formula 1.

<High-Temperature and High-Humidity Tests and High-Temperature Tests>

Luminance and color point positions of the color conversion film of Example 1, the color conversion film of Comparative Example 1 and the color conversion film of Comparative Example 2 are measured at different measuring times under a high-temperature (65° C.) and high-humidity (95% RH) environment and a high-temperature (85° C.) environment respectively. Then, luminance variation amounts and color point offsets are calculated, and results are shown in Tables 1-3.

TABLE 1

Test results of color conversion film of Example 1

| High-temperature and high-humidity tests | | | | High-temperature tests | | | |
| --- | --- | --- | --- | --- | --- | --- | --- |
| Test time (h) | Luminance (cd/m²) | Color point position (X-axis) | Color point position (Y-axis) | Test time (h) | Luminance (cd/m²) | Color point position (X-axis) | Color point position (Y-axis) |
| 0 | 4887 | 0.1486 | 0.2219 | 0 | 5034 | 0.1489 | 0.2218 |
| 96 | 5163 | 0.1488 | 0.2174 | 96 | 5359 | 0.1489 | 0.2215 |
| 258 | 5074 | 0.1489 | 0.2158 | 258 | 5383 | 0.1489 | 0.2205 |
| 402 | 5108 | 0.1493 | 0.2205 | 378 | 5393 | 0.1494 | 0.2197 |
| 546 | 4800 | 0.1495 | 0.2182 | 522 | 5180 | 0.1495 | 0.2219 |

TABLE 1-continued

Test results of color conversion film of Example 1

| High-temperature and high-humidity tests | | | | High-temperature tests | | | |
|---|---|---|---|---|---|---|---|
| Test time (h) | Luminance (cd/m$^2$) | Color point position (X-axis) | Color point position (Y-axis) | Test time (h) | Luminance (cd/m$^2$) | Color point position (X-axis) | Color point position (Y-axis) |
| Luminance variation amounts or color point offsets | −1.8% | 0.0009 | −0.0037 | Luminance variation amounts or color point offsets | 2.9% | 0.0006 | 0.0001 |

It can be known from the results of Table 1 that the luminance variation amount of the color conversion film of Example 1 is equal to or less than 15% under a high-temperature and high-humidity environment and a high-temperature environment 500 h after a test, and the color point offsets in X-axis and Y-axis are each equal to or less than +/−0.01, which shows that no failure area appears.

TABLE 2

Test results of color conversion film of Comparative Example 1

| High-temperature and high-humidity tests | | | | High-temperature tests | | | |
|---|---|---|---|---|---|---|---|
| Test time (h) | Luminance (cd/m$^2$) | Color point position (X-axis) | Color point position (Y-axis) | Test time (h) | Luminance (cd/m$^2$) | Color point position (X-axis) | Color point position (Y-axis) |
| 0 | 7130 | 0.1717 | 0.4084 | 0 | 7050 | 0.1714 | 0.4070 |
| 144 | 7081 | 0.1714 | 0.4027 | 144 | 6461 | 0.1688 | 0.3817 |
| 250 | 7065 | 0.1713 | 0.4006 | | Fail | | |
| 412 | 6521 | 0.1701 | 0.3876 | | | | |
| Luminance variation amounts or color point offsets | −8.5% | −0.0016 | −0.0208 | Luminance variation amounts or color point offsets | −8.3% | −0.0026 | −0.0253 |

It can be known from the results of Table 2 that a color point offset in Y-axis of the color conversion film of Comparative Example 1 exceeds +/−0.01 under a high-temperature and high-humidity environment, which shows that a failure area appears. In addition, a color point offset in Y-axis of the color conversion film of Comparative Example 1 exceeds +/−0.01 under a high-temperature environment, which also shows that a failure area appears. Therefore, compared with the color conversion film of Example 1, since the quantum dot composition used by the color conversion film of Comparative Example 1 does not include a polysilane polymer, the color conversion film of Comparative Example 1 may be easily affected by water vapor and oxygen and causes oxidization and failure of the quantum dot phosphor, which may lead to generation of a failure area.

TABLE 3

Test results of color conversion film of Comparative Example 2

| High-temperature and high-humidity tests | | | | High-temperature tests | | | |
|---|---|---|---|---|---|---|---|
| Test time (h) | Luminance (cd/m$^2$) | Color point position (X-axis) | Color point position (Y-axis) | Test time (h) | Luminance (cd/m$^2$) | Color point position (X-axis) | Color point position (Y-axis) |
| 0 | 5249 | 0.1543 | 0.3197 | 0 | 5012 | 0.1544 | 0.3529 |
| 120 | 4502 | 0.1542 | 0.3069 | 120 | 4595 | 0.1543 | 0.2920 |
| 264 | 3979 | 0.1532 | 0.2964 | | | | |
| Luminance variation amounts or color point offsets | −24% | −0.0011 | −0.0233 | Luminance variation amounts or color point offsets | −8.3% | −0.0001 | −0.0609 |

It can be known from the results of Table 3 that a luminance variation amount of the color conversion film of Comparative Example 2 exceeds 15% under a high-temperature and high-humidity environment, and a color point offset in Y-axis exceeds +/−0.01, which shows that a failure area appears. In addition, a color point offset in Y-axis of the color conversion film of Comparative Example 3 exceeds +/−0.01 under a high-temperature environment, which also shows that a failure area appears. Therefore, compared with the color conversion film of Example 1, since the matrix resin used by the color conversion film of Comparative Example 2 does not include the epoxy-fluorene copolymer acrylic resin represented by Formula 1, the color conversion film of Comparative Example 2 may be easily affected by water vapor and oxygen and causes oxidization and failure of the quantum dot phosphor thereof, which may further lead generation of a failure area.

In conclusion, in the quantum dot composition of the embodiment of the disclosure, since the quantum dot composition includes the epoxy-fluorene copolymer acrylic resin represented by Formula 1 and the polysilane polymer, the quantum dot composition has a favorable water vapor and oxygen barrier property. In addition, compared with a conventional color conversion film and a backlight module, the color conversion film and the backlight module of the embodiment include the quantum dot composition and thus are capable of providing a favorable water vapor and oxygen barrier property as well.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A quantum dot composition, comprising a matrix resin, a quantum dot phosphor, and a polysilane polymer, wherein:

the matrix resin comprises epoxy-fluorene copolymer acrylic resin represented by Formula 1:

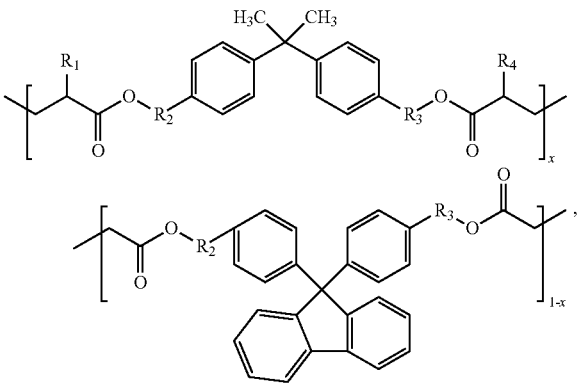

Formula 1 in Formula 1, $R_1$ and $R_4$ each is independently hydrogen or a C1-C12 long alkyl carbon chain, $R_2$ and $R_3$ each is independently

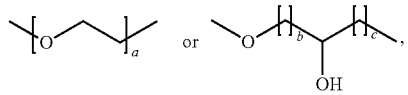

a is an integer from 1 to 10, and b and c each is independently an integer from 0 to 10, and X is 0.1 to 0.9.

2. The quantum dot composition according to claim 1, wherein the matrix resin further comprises a trifunctional monomer, and the trifunctional monomer comprises

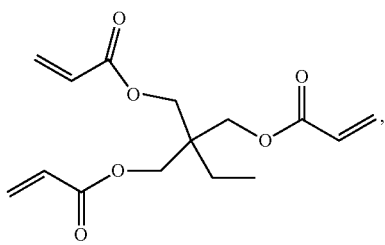

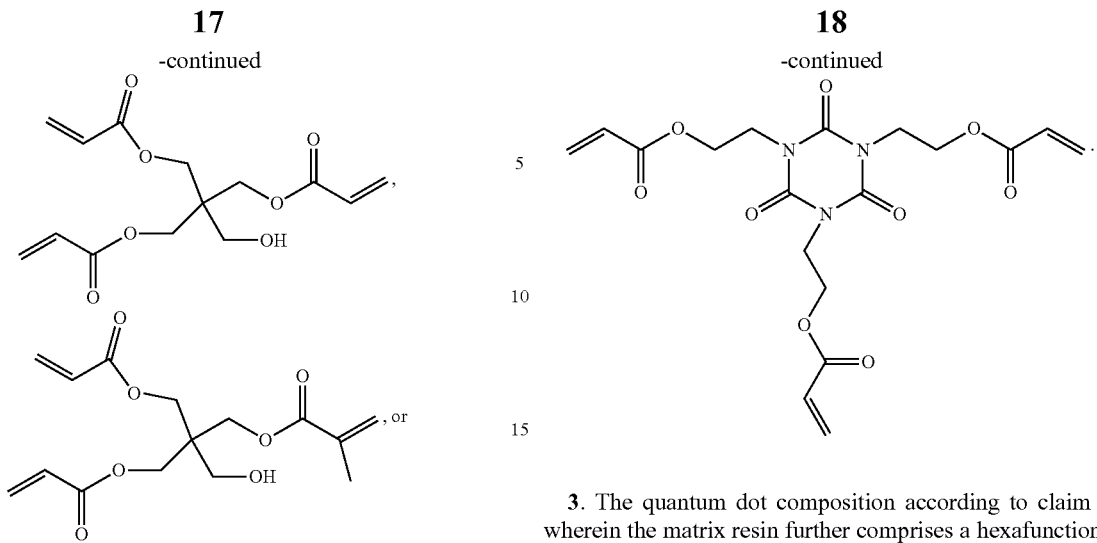
3. The quantum dot composition according to claim 1, wherein the matrix resin further comprises a hexafunctional monomer, and the hexafunctional monomer comprises
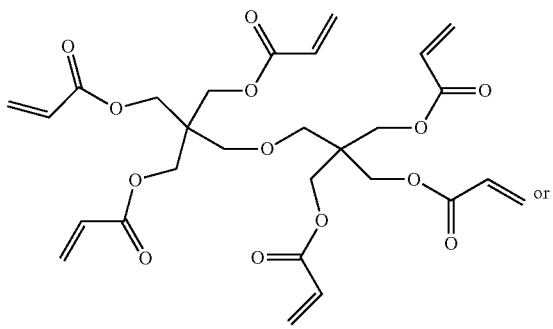
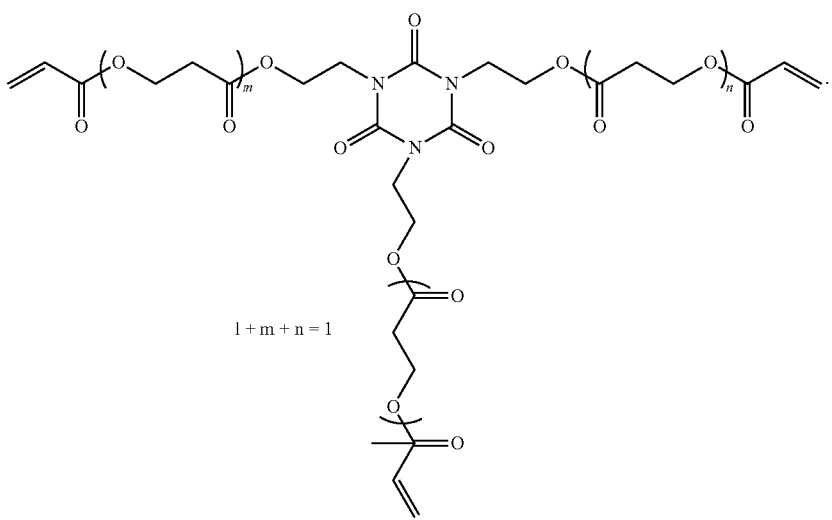
$l + m + n = 1$ 4. The quantum dot composition according to claim 1, wherein the polysilane polymer is of a straight chain shape, a branch chain shape, or a cyclic shape, and the polysilane polymer is represented by Formula 2:

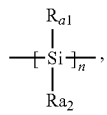

Formula 2 in Formula 2, $R_{a1}$ and $R_{a2}$ each is independently hydrogen, a group-carrying functional group, or a silyl group, and n is 10 to 500.

5. The quantum dot composition according to claim 1, wherein based on a total weight of the quantum dot composition, a content of the matrix resin is 45 wt % to 75 wt %, a content of the quantum dot phosphor is 0.01 wt % to 10 wt %, and a content of the polysilane polymer is 1 wt % to 20 wt %.

6. The quantum dot composition according to claim 5, wherein based on the total weight of the quantum dot composition, the content of the matrix resin is 52 wt % to 75 wt %, the content of the quantum dot phosphor is 0.1 wt % to 5 wt %, and the content of the polysilane polymer is 5 wt % to 10 wt %.

7. The quantum dot composition according to claim 1, further comprising:
a light-scattering particle, and the light-scattering particle comprises an organic light-scattering particle, an inorganic light-scattering particle, or a combination thereof.

8. The quantum dot composition according to claim 1, further comprising:
a sensitizer, comprising:

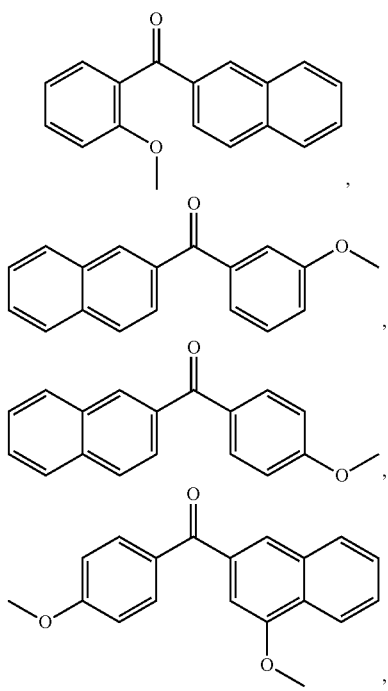

9. A color conversion film, comprising a first substrate layer, a quantum dot layer, and a second substrate layer, wherein:

the quantum dot layer is disposed on the first substrate layer, and the quantum dot layer comprises the quantum dot composition according to claim 1, and the second substrate layer is disposed on the quantum dot layer.

10. A backlight module, comprising a light source and a color conversion film, wherein:

the color conversion film is the color conversion film according to claim 9, and the color conversion film is disposed on a light emitting path of the light source.

* * * * *